Feb. 25, 1936.  C. L. EKSERGIAN ET AL  2,032,051
RAIL CAR WHEEL
Filed Nov. 17, 1933  2 Sheets-Sheet 1

INVENTORS
Carolus L. Eksergian&
Paul E. Baker.
BY
ATTORNEY.

Feb. 25, 1936.  C. L. EKSERGIAN ET AL  2,032,051

RAIL CAR WHEEL

Filed Nov. 17, 1933  2 Sheets-Sheet 2

INVENTORS
Carolus L. Eksergian &
Paul E. Baker.
BY
John P. Tarbox
ATTORNEY.

Patented Feb. 25, 1936

2,032,051

UNITED STATES PATENT OFFICE 2,032,051

RAIL CAR WHEEL

Carolus L. Eksergian and Paul E. Baker, Detroit, Mich., assignors to Edward G. Budd Manufacturing Co., Philadelphia, Pa., a corporation of Pennsylvania Application November 17, 1933, Serial No. 698,470

6 Claims. (Cl. 295—31)

The present invention relates to rail-car wheels, and more specifically to a pneumatic tired rail-car wheel for use on high speed, light rail-cars.

In pneumatic tired wheels intended for use on rail-cars, especially those intended for use on high speed, light rail-cars as in the present instance, it is necessary that the wheel structure be kept as light as possible without undue sacrifice of rigidity and strength.

The attainment of lightness with requisite strength, rigidity and wearing quality without undue increase in weight is beset with unusual difficulties because of the fact that in such wheels, due to the relatively large radial depth of the tire, the flange must be extraordinarily deep in order to extend beyond the tire tread into a position to engage the side of the rail head which, together with the necessity of curving the flange around the tire, tends to increase the amount of material.

The main object, therefore, of the present invention is to provide a flanged, pneumatic tired rail-car wheel of light simple structure without sacrifice of rigidity, strength, or wearing quality. As the flange in the present type of wheel constitutes a substantial portion of the wheel, not only as to material, but as to that part to which the greater stresses of centrifugal forces are applied, the invention seeks specially to reduce the weight of the flange while maintaining its requisite strength and wearing qualities.

These objects are obtained in general by constructing the wheel of pressed sheet metal with a novel formation and arrangement of parts such that in addition to their operative functions they will cooperate structurally to mutually support and strengthen each other in a manner to obtain maximum strength with minimum amount of material. Extreme lightness with ample wearing quality is attained by the provision of a separate flange ring member interposed between the flange and the rail-head to take the wear, and so constructed and arranged in relation to the flange as to aid materially in strengthening the same.

The above and other objects and advantages of the invention will be more clearly understood upon reference to the following specification and the drawings accompanying the same.

Figure 1:
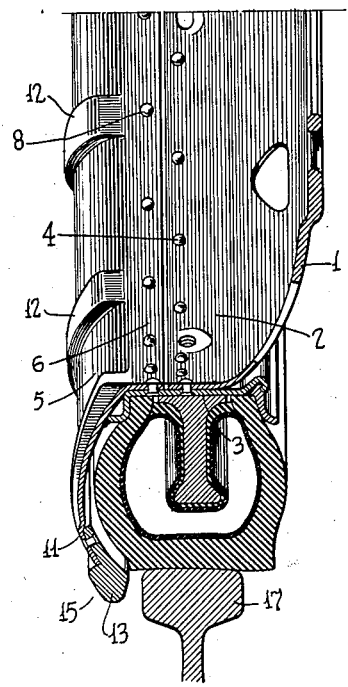
Fig. 1 is a vertical, axial section taken through the wheel and rail, showing the relative position of parts in relation to a rail head.

Referring to the drawings in detail, 1 is the main wheel body flange which in the present instance is extended axially inwardly at its periphery to form a cylindrical extension or flange 2, extending inwardly of the wheel across the plane of the wheel tread. A tire rim 3, is fitted over the extension 2, secured thereto by the circular line of rivets 4. The annular wheel flange 5, is formed of pressed sheet metal with its radially inner edge 6 extended axially outwardly into lapping or telescoping engagement with the radially inner surface of the inner side portion 7 of the tire rim and secured thereto by the circular line of rivets 8. The tire rim 3 thus unites the flange 5 and wheel disc 1 to itself to form a rigid unit.

Figure 2:
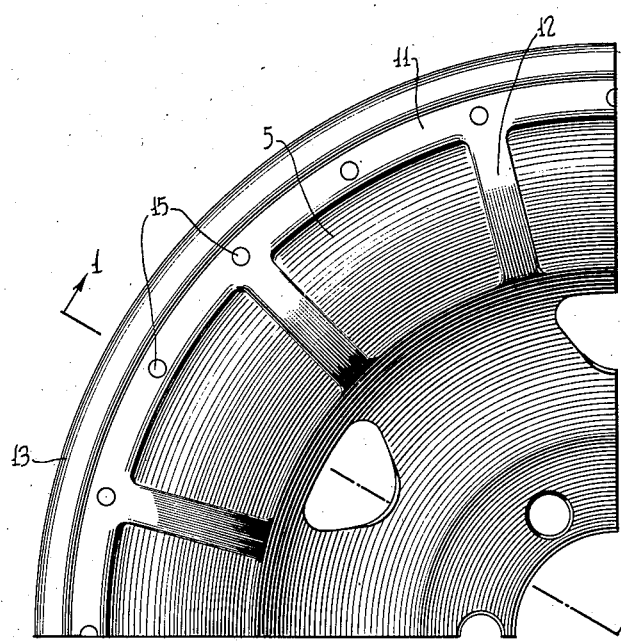
Fig. 2 is a fragmentary inside face view of the wheel.
Figure 3:
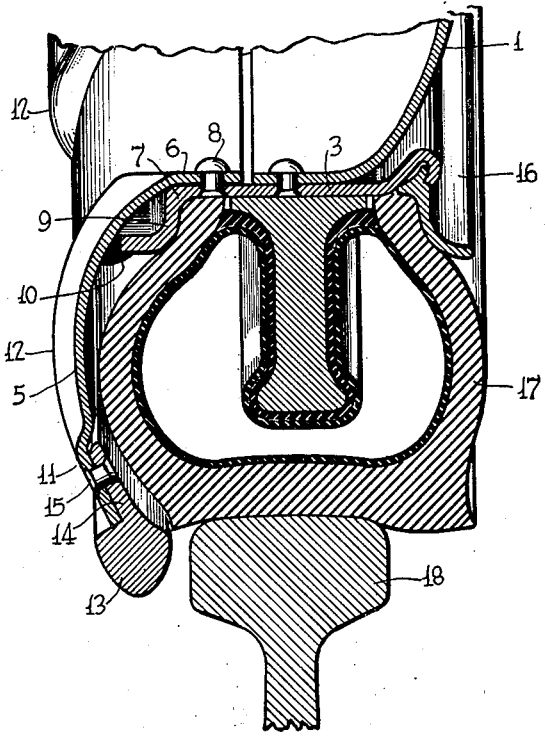
Fig. 3 is an enlarged sectional view of the tread and flange portion of the wheel and their relation to the rail head.

To obtain further strength and rigidity with minimum addition of material, the inner side wall 9 of the tire rim has its radially outer portion extended axially inwardly to the flange 5 and welded thereto as indicated at 10, preferably by arc welding. The inner side of the tire rim is thus secured to the wheel flange 5 along two spaced annular lines, a line of rivets 8 and line of welding 10, but is spaced therefrom between such lines so as to form an annular closed hollow rib, or box section rib giving added strength and rigidity at the line of juncture between the flange and rim. The wheel flange 5 is rendered rigid along its periphery by an annular rib in the form of an inwardly pressed peripheral marginal offset 11, and has its main body portion strengthened by a plurality of inwardly pressed ribs 12 extending radially from the central portion 6 of the flange to the offset 11, the peripheral ends of the ribs merging into the offset 11 to form a continuous ribbed net work as is clearly shown in Fig. 2. Cooperating with the ribs which show in Fig. 2, is the radially inner annular reinforcing rib of box section formed by the inner side of the tire rim and adjacent portion of the wheel flange.

To increase the wearing quality of the flange at the periphery a separate flange rim 13, of a material selected especially for its wearing qualities such as vanadium steel or the like, is provided which is relatively massive compared with the peripheral marginal portion of the flange and is secured thereto by means of an integral mounting flange 14 overlapping the wheel flange in nesting relation with the offset 11 and secured thereto in a suitable manner, preferably by an annular line of rivets 15. The mounting flange 14 thus also acts as a backing for the offset 11.

A suitable pneumatic tire 17 is mounted on the tire rim 3 and held therein by means of the usual split clamping ring 16. The parts are so proportioned that when the wheel is properly centered on a rail head 17 with the tire inflated the wheel flange will clear the inner side face of the tire while the flange ring 13 will extend radially beyond the periphery of the wheel flange so that the bottom portion of the flange rim will extend down along the side of the rail head with the main portion of the body material of the flange ring between the flange and the side of the rail head.

Figure 4:
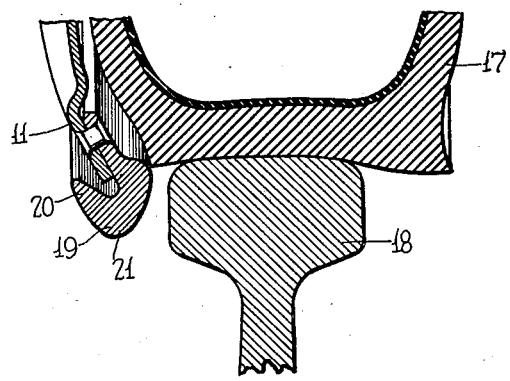
Fig. 4 is an enlarged fragmentary sectional view showing a modified form of flange ring.

As the flange ring 13 is of considerable thickness between the peripheral edge of the flange and the head of the rail it will be clear that considerable wear of the flange ring may take place without weakening the same, and that the extra metal used to afford this additional wearing quality is usefully applied to the strengthening of the wheel flange at the periphery.

Where it is desired to lighten the flange ring without unduly decreasing its strength and rigidity it may take the form of the flange ring 19 of Fig. 4. This flange ring is lightened by substituting an inwardly projecting reinforcing rib 20 for that portion of the ring extending inwardly of the wheel flange. The reinforcing rib 20 is made inwardly and upwardly projecting so as not to receive any wear from the rail head nor interfere with the proper operation of track switches by the tapered ridge 21 of the flange ring.

While we have herein shown and described certain specific embodiments of the invention for the purpose of disclosure, it is to be understood that the invention is not limited to such embodiments but contemplates all such modifications and variants thereof as fall fairly within the scope of the appended claims.

What we claim is:

1. A rail-car wheel comprising a wheel-body disc, a rim member and a flange member, said disc being extended axially inwardly at its periphery to overlap a portion of the rim and secured thereto through said extended portion, said flange member being extended axially outwardly to overlap an inner portion of the rim and secured thereto through the overlapping portion, the inner side of said rim extending radially outwardly from the flange extension, then axially inwardly to the flange member and secured thereto to form with the flange member an annular reinforcing rib of closed box section.

2. A pneumatic tire rail-car wheel comprising a wheel-body disc member extended axially inwardly at its periphery across the plane of tread of the wheel, a tire rim fitted over the disc extension and fixedly secured thereto, an inner portion of said rim extending radially inwardly beyond said disc extension, a pressed metal annular wheel flange having its radially inner edge extended axially outward into telescoping engagement with the radially inner side of said rim extension and secured thereto, said wheel flange extending radially outward to substantially the radial distance of the tire tread and spaced axially inwardly from the inner side of the tire, a marginal offset formed around the periphery of the flange, outwardly pressed ribs in said flange extending radially from the inner edge to the said marginal offset, and a relatively thick separate flange ring having a mounting flange fitted into said marginal offset and secured therein, said flange ring being arranged with the greater portion of its body material between the wheel flange and the rail head.

3. A pneumatic tire rail-car wheel comprising a wheel body, tire rim and wheel flange of relatively light structure, and a separate flange ring secured to the periphery of the wheel flange having a thickened portion between the flange and the side of the rail head with an inwardly projecting strengthening rib extending around the inner side of the ring.

4. A pneumatic tire rail-car wheel comprising a wheel body, a tire rim and a pressed metal annular wheel flange secured together to form a flanged wheel and tire rim, said wheel flange being strengthened by a peripheral inwardly pressed marginal offset extending circumferentially around the flange and a plurality of inwardly pressed ribs extending radially from the central edge of the flange to the peripheral offset and merging with the latter to form therewith a continuous ribbed network, and a relatively massive separate flange ring secured to the flange in said peripheral offset with the greater portion of its body material between the wheel flange and the rail head.

5. A rail-car wheel comprising a wheel-body disc, a rim member and a flange member, said disc being extended axially inwardly at its periphery to overlap a portion of the rim and riveted thereto through said extended portion, said flange member being extended axially outwardly to overlap an inner portion of the rim and riveted thereto through the over-lapping portion, and an inner wall for said rim extending radially outwardly then axially inwardly to the flange member and welded thereto to form a continuous annular rib of closed box section.

6. A pneumatic tire rail-car wheel comprising a sheet metal wheel body, tire rim and wheel flange secured together to form a flanged wheel and tire rim, said rim and flange being secured together along two spaced annular lines but separated from each other between said lines to form an annular closed hollow rib.

CAROLUS L. EKSERGIAN.
PAUL E. BAKER.